(12) United States Patent
Rogalla et al.

(10) Patent No.: US 7,699,087 B2
(45) Date of Patent: Apr. 20, 2010

(54) METHOD FOR MOUNTING A PNEUMATIC TIRE

(75) Inventors: Martin Rogalla, Darmstadt (DE);
Matthias Lemser, Weiterstadt (DE);
Andreas Peinelt, Pfungstadt (DE);
Georg Lipponer, Zwingenberg (DE)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 11/476,529

(22) Filed: Jun. 28, 2006

(65) Prior Publication Data

US 2007/0000616 A1    Jan. 4, 2007

(30) Foreign Application Priority Data

Jun. 29, 2005   (DE) .................. 10 2005 030 692
May 8, 2006    (EP) .................... 06113649

(51) Int. Cl.
*B60C 25/00*   (2006.01)
*B60C 25/122*  (2006.01)
(52) U.S. Cl. ................................ 157/1.1; 157/1.28
(58) Field of Classification Search .............. 157/1, 157/1.1, 1.17–1.24, 11, 1.26, 1.28
See application file for complete search history.

(56) References Cited

U.S. PATENT DOCUMENTS

| 2,903,049 | A | * | 9/1959 | Carlson ................ 157/19 |
| 4,314,597 | A | * | 2/1982 | Zrostlik et al. ........ 157/1.11 |
| 4,621,671 | A |   | 11/1986 | Kane et al. |
| 5,013,010 | A |   | 5/1991 | Steffel |
| 5,170,828 | A | * | 12/1992 | Curcuri ................ 157/1 |
| 5,222,539 | A |   | 6/1993 | Ruppert et al. |
| 5,339,880 | A |   | 8/1994 | Kawabe et al. |
| 6,619,362 | B2 | * | 9/2003 | Corghi ............... 157/1.24 |
| 6,877,544 | B2 | * | 4/2005 | Kane et al. ........... 157/1.24 |

FOREIGN PATENT DOCUMENTS

| DE | 3614738 | 11/1987 |
| DE | 9103506 | 6/1991 |
| DE | 4019992 | 1/1992 |
| DE | 10 2005 001 212 | 7/2006 |
| EP | 0377760 | 1/1989 |
| JP | 58033579 A * | 2/1983 |
| JP | 61057401 A * | 3/1986 |
| JP | 06286437 A * | 10/1994 |
| WO | WO99/42309 | 8/1999 |

* cited by examiner

*Primary Examiner*—Hadi Shakeri
(74) *Attorney, Agent, or Firm*—Collard & Roe, P.C.

(57) ABSTRACT

Method for mounting a pneumatic tire on a well base rim of a motor vehicle wheel, in which the pneumatic tire is grasped by means of a manipulator, brought up to a rim held in a clamping device and slipped with at least the one tire bead facing the rim over a rim flange by controlled movement of the manipulator.

10 Claims, 3 Drawing Sheets

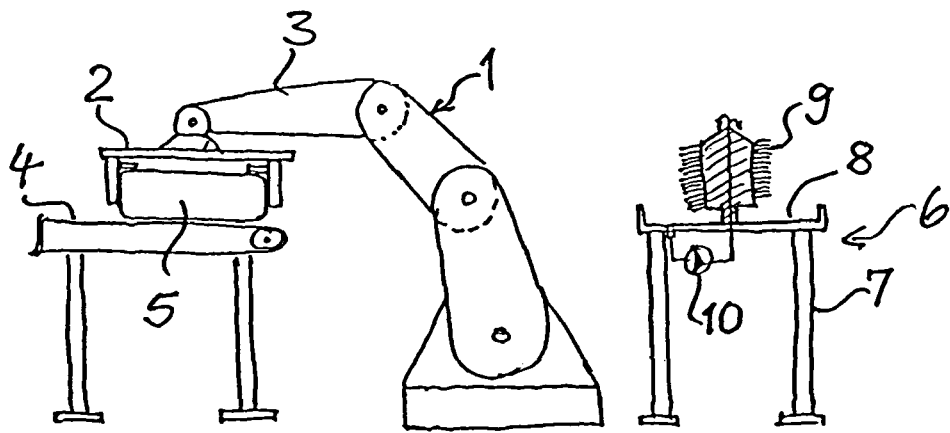
FIG. 1
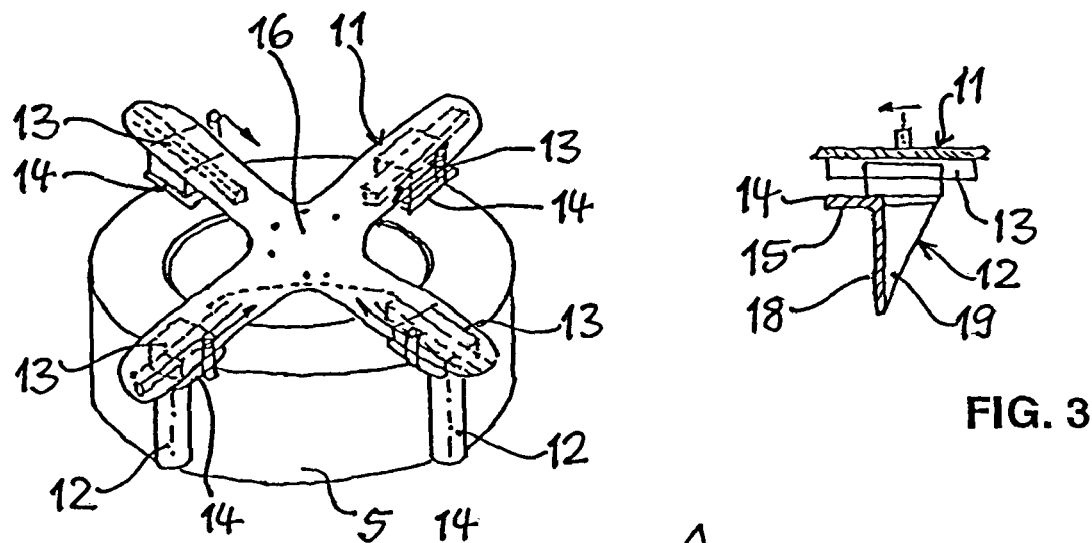
FIG. 2
FIG. 3
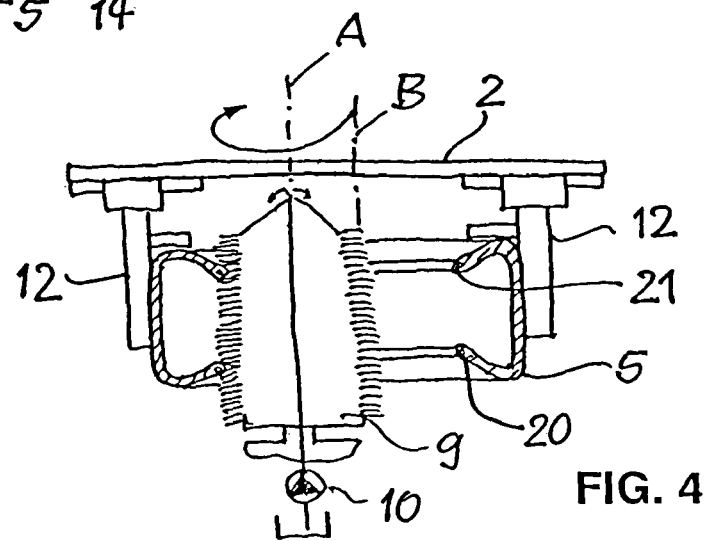
FIG. 4

METHOD FOR MOUNTING A PNEUMATIC TIRE

CROSS-REFERENCE TO RELATED APPLICATION

This application claims the benefit of German Patent Application No. 10 2005 030 692.6 filed Jun. 29, 2005, and of European Patent Application No. 06 113 649.5 filed on May 8, 2006, both applications incorporated herein by reference.

FIELD OF THE INVENTION

The invention relates to a method for mounting a pneumatic tire on a well base rim of a motor vehicle wheel and to an apparatus for carrying out the method.

BACKGROUND OF THE INVENTION

In a hitherto conventional method for mechanical mounting of vehicle wheels, the rim is held firmly in a horizontal position by means of a clamping device, with the rim dish facing up- or downwards. The pneumatic tire is placed on the rim at an angle and pushed thereonto until the lower tire bead is forced with a lower portion into the rim well base, while it projects with its upper portion over the upper rim flange. Then fitting tools are lowered onto the tire and the rim from above and press the tire sidewall downwards into the depth of the rim well base. By rotating the fitting tools about the axis of rotation of the rim, the tire bead is then drawn continuously over the upper rim flange. This known method has the disadvantage that it stresses the tire very severely during mounting. In the case of tires which are difficult to mount, problems may also arise due to the tire bead not remaining sufficiently in the well base during the mounting procedure as a result of the inherent rigidity of the tire. At the end of the fitting movement, the free length of the tire bead is then insufficient for it to pass over the rim flange, such that considerable shear forces arise as the fitting tools rotate further. Additional technical problems also arise with the known method from the requirement for a high level of flexibility with regard to the different combinations of rim and pneumatic tire to be handled, and from the requirement for short machine cycle times.

With tires which are very easy to mount, the two tire beads are fitted in the manner described above jointly in a single operation. If, on the other hand, it is necessary to mount the tire beads separately, the fitting tool is subject to conflicting requirements. To fit the first bead, the tool has to be of particularly narrow construction, so that it can be inserted without difficulty between the rim flange and the upper bead. When it is raised after mounting of the first bead, it must not get caught on the tire. For mounting of the second bead, on the other hand, it is desirable to have a wide fitting tool available, since low tires with a high level of inherent rigidity have a tendency to come off a narrow fitting roller, such that the tool becomes wedged between rim flange and tire bead as the mounting procedure progresses.

Tire mounting design is also subject to additional technical problems resulting from the requirement for a high level of flexibility with regard to the combinations of rim and pneumatic tire to be handled, and from the requirement for short machine cycle times.

An installation for mounting pneumatic tires on well base rims is known from U.S. Pat. No. 4,621,671, in which the rims are conveyed on pallets with predetermined spacing along a conveyor to two tire mounting devices located one behind the other. The pneumatic tires are transferred into the conveyor via a tire soaping station upstream of the first tire-mounting device, in such a way that in each case one tire arrives in front of one rim in the conveying direction and is placed aslant onto the next rim. As it passes through the first mounting device, the pneumatic tire is then pressed onto the rim by means of a roller rolling thereover, in such a way that the lower tire bead is slipped over the rim flange. Then, in the second mounting station the upper bead of the preliminarily mounted tire is mounted by means of conventional mounting tools passed along the rim flange. This known method has the disadvantage that, during mounting of the lower bead, the pneumatic tire may move in an uncontrolled manner as a result of the roller moving thereover and be damaged thereby. Moreover, each change of tire type or rim type requires complex adjustment of the tire delivery system and of mounting roller movement.

A further apparatus for mounting a pneumatic tire on a rim is known from WO99/42309, said apparatus comprising a robot with an articulated arm movable in three directions, said arm being movable along a movement path which may be selected from a large number of programmable, predetermined movement paths stored in the memory of a central unit. The articulated arm bears at its free end a mounting tool which is moved along the rim edge to mount a tire bead. The robot comprises sensors, which measure the load on the articulated arm, and the robot's control program includes a monitoring function, which stops movement of the tool if the load exceeds a predetermined value. The apparatus additionally comprises a clamping device, which forces the tire into a tilted position prior to mounting and prevents rotation of the tire on the rim.

SUMMARY OF THE INVENTION

It is an object of the invention to provide a method for at least one-sided automatic mounting of pneumatic tires on well base rims, which method is kind to the pneumatic tires during mounting, is suitable for a series of different combinations of well base rims and pneumatic tires and is easy to set up. It is a further object of the invention to provide an apparatus suitable for carrying out the method, which apparatus is distinguished by low structural complexity and may be simply set up and optimized.

According to the invention this object is achieved by a method for mounting a pneumatic tire on a well base rim of a motor vehicle wheel, wherein the pneumatic tire is grasped by means of a manipulator, brought up by the manipulator to the rim held in a clamping device and slipped with at least the one tire bead facing the rim over one rim flange by controlled movement of the manipulator. Advantageous developments of the method are indicated in claims 2 to 9.

The method according to the invention has the advantage that the manipulator may perform predetermined or freely programmable positioning and movement of the tire corresponding precisely to the mounting requirements. The forces and moments which arise during mounting remain smaller than with the hitherto known mounting methods. The tire is therefore protected. Since the manipulator holds the tire during the mounting procedure, the tire cannot perform any uncontrolled movements. It is thus ensured that the set and optimized movement sequence is observed. The method according to the invention has the additional advantage of being largely independent of the construction of the tire and the construction of the rim or the dimensions thereof. To hold and clamp different tire and rim sizes, it is sufficient to adjust accordingly the working stroke of the devices for holding and clamping and the positioning and movement of the tire. Conventionally, these movement sequences are controlled by means of a programmable servo controller, for example a CNC controller, such that the system may in each case be set up simply for the intended application by inputting application-specific data and programs.

A further advantage of the method according to the invention is that the manipulator may be used to fetch the tire to be mounted from a conveyor means delivering the tire, move it to a soaping station and then mount it. During the entire sequence, the tire is held and guided by the manipulator. This allows high conveying speeds and correspondingly short cycle times and prevents incorrect positioning of the tire on transfer from one conveyor means to the next.

The method according to the invention additionally offers the advantageous possibility of matching the tire during tire mounting. Matching should be understood to mean aligning the tire relative to the rim in a defined angular position, in order to optimize the wheel's true running characteristics. To this end, the tire and rim exhibit marks which have to be brought into alignment by turning the tire relative to the rim. Hitherto, matching has been performed in a special machine after the tire has been mounted, since the tire may rotate in uncontrolled manner relative to the rim during mounting. This risk arises in particular during mounting of the first tire bead. In the method according to the invention, the tire is held by the manipulator even during mounting and may therefore be brought into the defined matched position on the rim, wherein, to achieve the matched position, the tire may be rotated by means of the manipulator or the rim may be rotated in or with the clamping device. When mounting the second bead, rotation of the tire relative to the rim may be ruled out to a considerable extent.

The method according to the invention may be used for mounting just one tire bead or, in suitable cases, also for mounting both tire beads. If it is intended that automatic mounting of a very large number of different tire types should be possible, according to the invention the first tire bead may be mounted by means of the manipulator in accordance with the method indicated in claim 1 and the second tire bead may be mounted using a downstream, conventional mounting means with mounting tools passed along the rim flange. Such a combination of the two procedures makes possible short cycle times, if the two mounting methods may be used simultaneously, and may even be used when only the conventional procedure is possible due to the tire or rim construction.

Further, according to the invention, an apparatus for carrying out the method is provided comprising a manipulator such as an industrial robot with an articulated arm movable in three directions, which bears at its free end a gripper, preferably movable relative to the articulated arm, for gripping and holding pneumatic tires. The gripper is so designed that the tires may be gripped by their outer circumference and held in non-interlocking manner by radial clamping. Preferably, the tire is held at three or more points distributed about the circumference and located on the tire tread.

In order to ensure a defined position of the tire held by the gripper relative to the articulated arm, the gripper comprises radially movable gripper fingers, whose radial movements are synchronized. The gripper is additionally provided with stop faces, which are placed against the tire sidewall in order to position the tire in the axial direction relative to the gripper and to transmit axial forces during tire mounting. Preferably, the stop faces are arranged on the movable gripper fingers, such that their radial extension is independent of the diameter of the tires to be mounted.

The gripper may be rotatable on the articulated arm about a central axis located in the centre of the gripper fingers and movable by means of an actuator into any desired rotation angle position and fixable therein. This makes possible rotation of the tire for the purpose of matching tire and rim during mounting.

According to a further proposal of the invention, in order to simplify the mounting procedure provision may be made for the pneumatic tire to be radially deformed using the manipulator in such a way that the tire bead to be mounted adopts an oval shape. To make this possible, the gripper fingers may be controlled in such a way that they perform a defined asynchronous clamping movement.

The method according to the invention is additionally characterized in that, prior to mounting of the pneumatic tire, the latter is conveyed by the manipulator to a soaping station for soaping the tire beads with lubricant and in the soaping station is moved with the tire beads along an application means for the lubricant. This method step makes it possible for the soaping station to be of a very simple, inexpensive design, without the need for moving application means and special conveyor means.

The apparatus according to the invention additionally comprises a mounting station with a clamping device for holding the rim during tire mounting. To match rim and tire, the clamping device may be rotatable about the axis of rotation of the rim and fixable in any desired rotation angle position.

Furthermore, a soaping station with an application means, in particular a brush, for soaping the tire beads with lubricant may be arranged in the working range of the manipulator. Preferably, the soaping station is located directly at the end of a conveyor means for delivering the tires to be mounted. Provision may also be made for the soaping station to be incorporated into the end portion of the conveying section of the above-mentioned conveyor means.

BRIEF DESCRIPTION OF THE DRAWINGS

The invention is explained in greater detail below with reference to exemplary embodiments, which are illustrated in the drawings, in which FIG. 1 is a schematic representation of a manipulator according to the invention with tire delivery means and soaping station, FIG. 2 is a perspective representation of a gripper of the manipulator, FIG. 3 is a sectional view of an embodiment of a gripper finger, FIG. 4 shows soaping of the tire beads in a soaping station according to the invention.

DETAILED DESCRIPTION OF THE PREFERRED EMBODIMENTS

Figure 5:
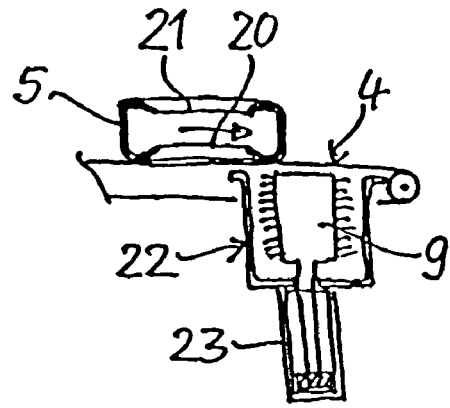
FIG. 5 is a schematic representation of a soaping station incorporated into the conveyor means for delivering tires.

FIG. 1 shows a manipulator 1 with a gripper 2, which is intended for tire mounting according to the above-described method. The manipulator 1 is an industrial robot with an articulated arm 3 comprising a plurality of movement axes, by means of which the gripper may be moved in three spatial directions. In addition, the gripper 2 is connected to the articulated arm 3 so as to be rotatable about two axes. The manipulator comprises a plurality of independent drives, which may be controlled by a programmable control means and allow precisely positioned movement of the gripper 2.

Within the working range of the manipulator 1, there is located the end of a conveyor means 4 for intermittent delivery of the pneumatic tires 5 to be mounted to the manipulator 1. Also located within the working range of the manipulator 1 is a soaping station 6, which serves to soap the tire beads with a lubricant prior to mounting. The soaping station 6 comprises a table 7 with a shallow trough 8, in the middle of which there is arranged a cylindrical, stationary brush 9. Liquid lubricant, for example soap solution, is delivered from the trough 8 to the top of the brush 9 through a feed line in the centre of the brush 9 by means of a pump 10 arranged under the trough 8, whereby the brush 9 is soaked with lubricant.

Within the working range of the manipulator 1 there is additionally located a mounting station, not shown in FIG. 1, in which the tires delivered by the conveyor means 4 are mounted by means of the manipulator 1 on rims delivered to the mounting station. The mounting station may be arranged in a mounting line, which comprises a second conventional mounting station downstream of the mounting station.

FIG. 2 shows an embodiment of the gripper 2 in which four gripper fingers 12 are mounted on a cross-shaped support 11 so as to be radially movable in slide guides 13. The movement axes of the slide guides 13 are located in a plane parallel to the support 11. The gripper fingers 12 extend in the same direction perpendicular to the support 11 and are oriented parallel to one another. Attached to the guided end of the gripper fingers 12 are stop plates 14, which extend radially inwards parallel to the slide guides 13 and comprise stop faces, which serve to rest against the tire sidewall. On the side remote from the gripper fingers 12, the support 11 comprises a central connecting face 16 which serves for attachment of a connector connecting the support 11 to the articulated arm 3. Radial movement of the gripper fingers 12 is effected by a drive means arranged on the side of the support 11 remote from the gripper fingers 12, which drive means is provided with a synchronizing means for synchronous movement of the gripper fingers 12. The synchronous movement of the gripper fingers 12 ensures that the tires are aligned with the middle of the gripper on gripping and thus assume a defined position relative to the gripper 2 and to the articulated arm 3, with which position the movement of the manipulator 1 may be aligned.

As an alternative to synchronous movement of the gripper fingers 12, asynchronous movement may also be provided, if for example the tire is to be pressed into an oval shape by the gripper 2. In this case too, however, movement of the gripper fingers 12 must take place in centered manner, such that the centre of the tire oval lies at the centre of the gripper.

It is intended that the preferably pneumatically, but also electrically or hydraulically producible application force, with which the gripper fingers 12 are pressed against a tire when gripping it, may be varied by means of the controller so that tires of different masses and rigidities may be equally well handled and not damaged. In the case of pneumatic or hydraulic drive of the gripper fingers, the application force may be simply adjusted by changing the operating pressure to the desired value.

FIG. 3 shows a cross-section through a gripper finger 12 in the form of a shaped sheet metal part, which is mounted so as to be movable lengthwise in a slide guide 13 on an arm of the support 11. An angle iron forms, with a short leg, the stop plate 14 with stop face 15 which may be placed against the tire wall and, with its long leg, a clamping face 18 which may be pressed against the tire tread. A web plate 19 supports the gripper finger 12 in deflection-resistant manner on the slide guide 13.

FIG. 4 shows the process of soaping the tire beads with a lubricant in the soaping station 6. The pneumatic tire 5, held by its tread by means of the gripper 2, is moved to above the brush 9 in the soaping station by means of the manipulator 1 and then lowered far enough for the brush 9 to penetrate into the openings in the two tire beads 20, 21. In this procedure, the tire is aligned substantially centrally with the brush 9, whose diameter in the instance illustrated here is smaller than the internal diameter of the beads 20, 21. Then the pneumatic tire 5 is moved radially relative to the brush 9 until the beads 20, 21 come into contact with the brush 9 at one point. Then pneumatic tire 5 and gripper 2 are moved, with their central axis B parallel to the axis A of the cylindrical brush 9, once or repeatedly on a circular path about the axis A of the brush 9, wherein the brush 9 slides along the tire beads 20, 21 and soaps them completely with lubricant. After soaping, the pneumatic tire 5 is again centered relative to the brush 9 and then raised out of the soaping station.

Figure 6:
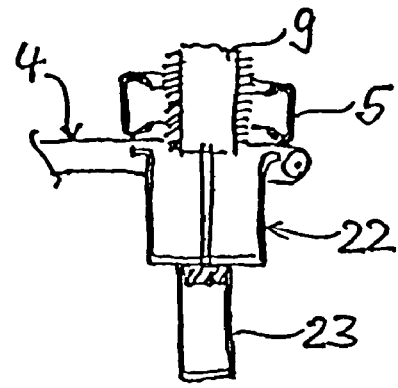
FIG. 6 shows soaping of a tire using the soaping station according to FIG. 5

FIGS. 5 and 6 show a soaping station 22 incorporated into the conveyor means 4 for delivering the pneumatic tires 5, said soaping station 22 comprising a brush 9 which may be displaced vertically by means of a pneumatic lifting cylinder 23. As the pneumatic tire 5 is conveyed into place, the brush 9 the soaping station 22 is lowered to a position beneath the conveying path of the pneumatic tire 5, as shown in FIG. 5. Once the pneumatic tire 5 is in its transfer position, in which it is arranged substantially centrally over the brush 9, the brush 9 is raised by the lifting cylinder 23 and introduced into the tire 5. At the same time, the gripper is brought up to the pneumatic tire 5 from above by the manipulator and grips said tire. Subsequent soaping of the tire beads 20, 21 with lubricant takes place in the same way as described above with reference to FIG. 4.

Figure 7:
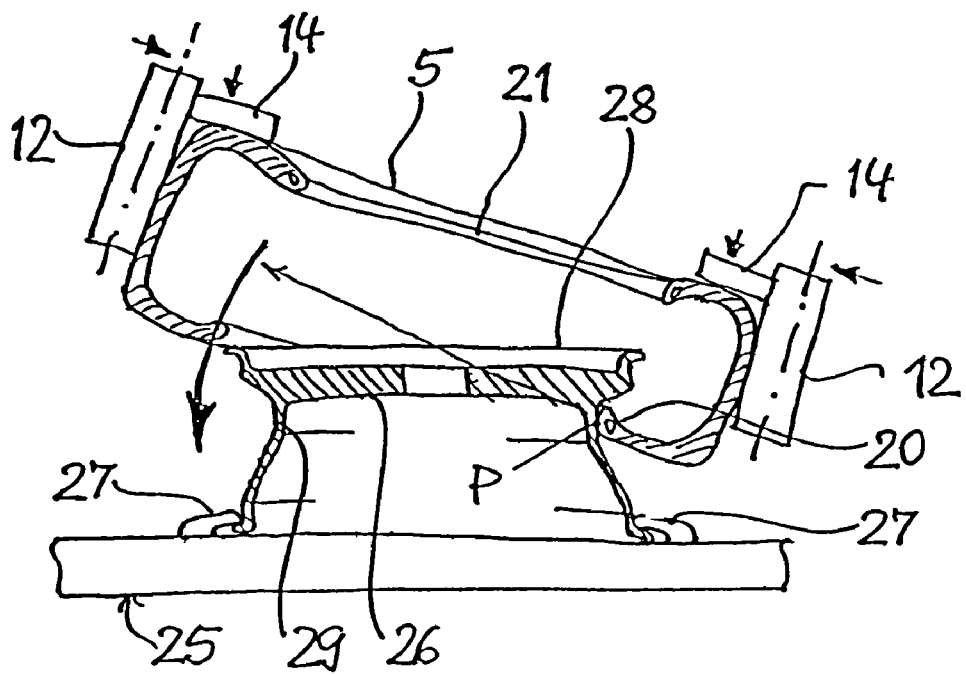
FIG. 7 is a sectional representation of well base rim and pneumatic tire in an intermediate position during mounting of the lower tire bead.

Once the tire beads of a pneumatic tire 5 held by the gripper have been soaped with lubricant, the pneumatic tire 5 is transported to a mounting station 25 for mounting of the first tire bead 20. As shown in FIG. 7, in the mounting station 25 the rim 26 associated with the tire is fixed in a horizontal position by means of suitable clamping means 27. On the way to the mounting station 25, the manipulator 1 moves the pneumatic tire 5 out of its original horizontal position into an oblique position inclined relative to horizontal approximately by an angle of between 20° and 50° by appropriate swiveling of the gripper 2 relative to the articulated arm 3 (i.e. by rotation around axis C shown in FIG. 9). The pneumatic tire 5 is then lowered onto the rim 26 and, with the highest point at the front, it is slipped substantially in the radial direction with the lower bead 20 over the upper rim flange 28, wherein the latter penetrates partially into the opening of the tire bead 20 and the tire bead 20 positions itself with its deepest point against the well base 29 of the rim 26. Once this situation has been achieved, radial movement of the tire relative to the rim 26 is terminated and the tire is rotated about the contact point P between the tire bead 20 and the well base 29 in such a way that the tire once again adopts an approximately horizontal position. In the process, the tire bead 20 is slipped completely over the rim flange 28, without the need for significant force.

In the above-described mounting procedure the forces and loads taking effect at the manipulator may be measured and monitored. If given predetermined force or load variables are exceeded during mounting, this indicates mounting problems. It is therefore possible, if the controller of the manipulator is suitable designed, to intervene in the mounting procedure before the tire becomes seriously damaged, so avoiding rejects.

Once the lower tire bead 20 has been mounted, the gripper is opened and brought back into the starting position to fetch the next tire. The rim is transported with the partially mounted tire by a conveyor means to the next mounting station, which uses conventional mounting methods. All that remains to be done in this mounting station is for the upper tire bead to be mounted. Since it is no longer necessary to mount the lower tire bead, the cycle time for this mounting procedure is reduced considerably. An additional advantage here is that the mounting tools may be optimized specifically for mounting of the upper tire bead, allowing for example use of a wider fitting roller. Set-up of the mounting apparatus is also simpler and process reliability is increased.

It is possible that, in the case of narrow and/or soft tires, mounting of the lower tire bead using the manipulator may be problematic. This may be the case, in particular, if such tires have been deformed during previous storage, for example if upper and lower tire bead are resting against one another. In these cases, a mounting installation with a first mounting station according to the invention and a second mounting station of conventional type with mounting tools passed along the rim offers the possibility of mounting both tire beads in conventional manner. The manipulator then has the task of picking up the tire which is delivered, providing it with lubricant in the soaping station and then positioning it in the first mounting station in the position on the rim which is suitable for further mounting. Rim and tire are then transported to the second conventional mounting station, where upper and lower tire bead are mounted jointly as is conventional with such tires.

In the method according to the invention the manipulator may perform a plurality of functions, namely all functions relating to transport of the tire between the tire delivery means and the first mounting station, movement of the tire in the soaping station and mounting of the lower tire bead or both tire beads. In comparison to known solutions, the soaping station in particular is very greatly simplified by using the manipulator. However, this simplification does not compensate for the additional expenditure on the manipulator. The method and apparatus according to the invention become economically advantageous, however, if the cycle time of the overall installation and the functional improvements are taken into account. For instance, it has proven possible to reduce cycle time relative to previous installations by over 40% in the case of separate mounting of the tire beads, which is of considerable economic benefit to the operator of the installation. Functional advantages result from the freely programmable movement of the manipulator, which enables precise positioning of the different tire sizes in accordance with requirements. In this way, mounting forces and mounting moments remain lower than with known mounting methods. The tire is protected and faults occur less often. The mounting tools for conventional mounting of the upper tire bead may be optimized with this task in mind. Time-consuming set-up and optimizing operations may thus be dispensed with and the upper tire bead is mounted more gently. This gentler mounting involving lower levels of internal stress results in better seating of the tire on the rim and in improved uniformity values for the mounted wheel. No separate machine for stabilizing tire seating is necessary. The manipulator may detect excess loads on all the movement axes and so more effectively prevent tire damage which may be detected only with difficulty. Monitoring of the loads arising during mounting also makes it possible to intervene in the mounting procedure before the tire has been irreparably damaged. The programmable nature of the movements of the manipulator additionally makes it possible to reduce set-up effort.

The method according to the invention also makes it possible to perform matching of pneumatic tire and rim particularly simply and inexpensively. To achieve the best possible true running, pneumatic tire and rim are marked with "matching points" during production. In the case of the pneumatic tire, the matching point identifies the peak of the first harmonic radial force variation. In the case of the rim, the matching point identifies the lowest point of radial run-out. If, during mounting of the tire, the two matching points are brought into alignment, i.e. are arranged in the same radial plane relative to the axis of rotation, experience shows that optimum true running characteristics are achieved.

Conventionally, matching is performed in independent matching machines once tire mounting has been completed. The procedure involves using cameras to detect the position of the matching points and then turning the tire accordingly relative to the rim, which requires the tire beads to be pushed away from the rim flanges again.

Figure 8:
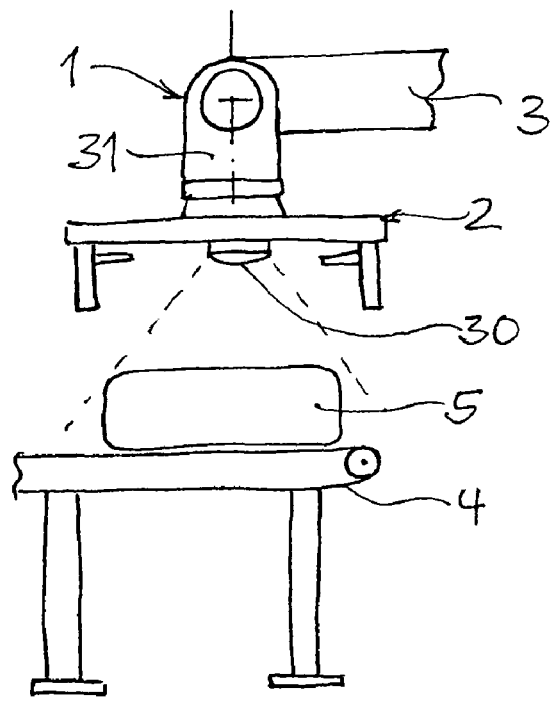
FIG. 8 is a schematic representation of detection of the matching point by means of a camera on the manipulator.
Figure 9:
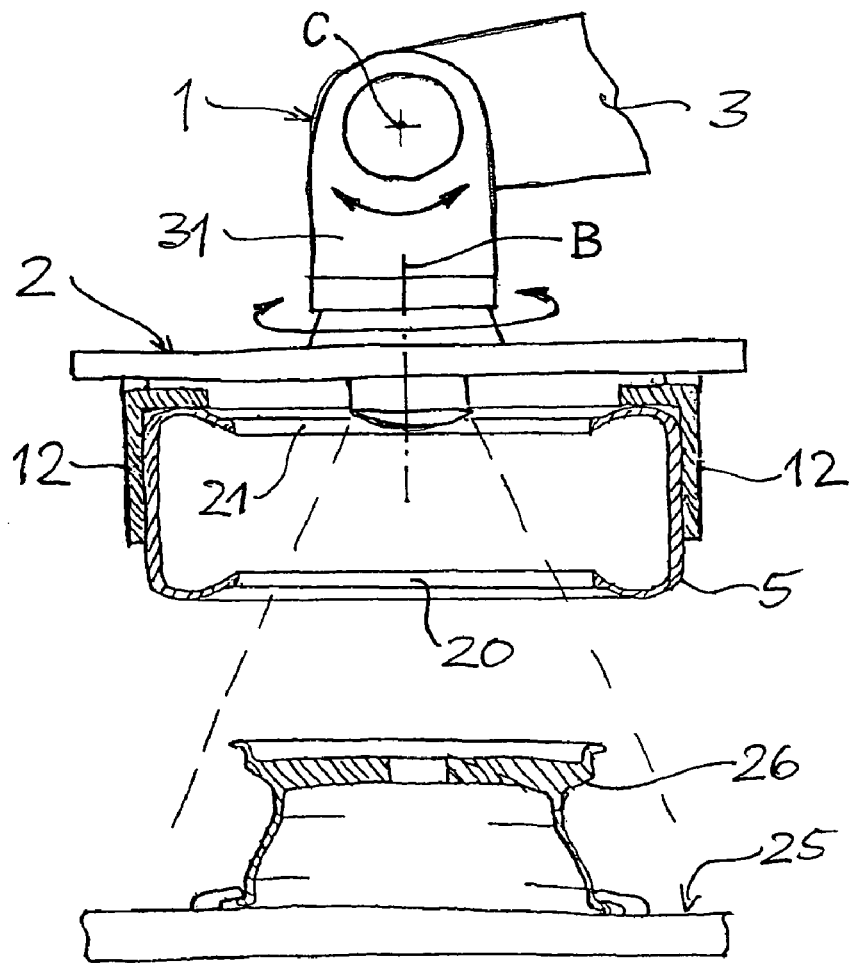
FIG. 9 is a schematic representation of matching prior to mounting of the tire.

In the method according to the invention illustrated in FIGS. 8 and 9, to detect the matching points the gripper 2 of the manipulator 1 is provided on its underside facing the pneumatic tire with a preferably centrally arranged camera 30. Furthermore, the gripper 2 is mounted on the articulated arm 3 so as to be rotatable about a central axis B coinciding with the axis of rotation of a pneumatic tire held by the gripper 2. The gripper 2 may be rotated into any desired rotation angle position and fixed therein by means of an actuator 31 supported on the articulated arm 3. The actuator 31 may comprise a driven shaft of the industrial robot constituting the manipulator 1 or a separate actuator.

As is shown in FIG. 8, detection of the matching points of the pneumatic tire 5 takes place when the latter is fetched by the manipulator 1 from the conveyor means 4 delivering the pneumatic tire 5. In the process, the gripper is moved first of all into a position above the pneumatic tire 5 in which the camera 30 may acquire an image of the top of the tire 5. The camera 30 is connected to an image analysis computer, which determines the rotation angle position of the matching point in relation to the gripper. In addition, further image information may be analyzed for the purpose of monitoring the mounting procedure. For example, the image acquired by the camera 30 may also be used for more precise positioning of the gripper 2 over the pneumatic tire 5. Once the camera 30 has acquired the image information for the pneumatic tire 5, the gripper 2 is lowered onto the pneumatic tire 5 and then the pneumatic tire 5 is gripped by moving the gripper fingers 12 together. As described above, the manipulator 1 then transports the pneumatic tire 5 firstly to the soaping station and then to the mounting station 25.

In the mounting station 25, as FIG. 9 shows, the gripper 2 is firstly positioned above the rim 26 already clamped therein in such a way that the camera 30 may acquire an image of the top of the rim 26 and the matching point provided thereon. These image data are in turn also analyzed by the connected image analysis computer and the rotation angle position of the matching point on the rim 26 is compared with the rotation angle position of the matching point, assigned to the gripper 2, of the pneumatic tire 5 held by the gripper 2. The determined difference in rotation angle is transmitted as a control signal to the control means of the manipulator 1 and under the control thereof the gripper 2 is rotated by the actuator 31 by the determined difference in rotation angle. The two matching points are thereby brought into alignment. Then the pneumatic tire 5 is mounted firstly with its lower tire bead 20 on the rim, as has already been described with reference to FIG. 7, wherein the pneumatic tire 5 is held firmly by the gripper 2 in the set rotation angle position until completion of the mounting procedure. The same applies to mounting of the second tire bead 21. If rim and pneumatic tire are transported for this purpose to another mounting station, care must be taken not to let them rotate relative to one another.

The above-described method allows matching of pneumatic tire and rim to be achieved with little effort as early as during mounting.

In contrast to the above-described method, matching of pneumatic tire and rim may also take place after mounting of the first tire bead, by raising the pneumatic tire with the gripper until it can be readily rotated on the rim. The further possibility also exists of opening the gripper after mounting of the first tire bead, raising it and using the camera to detect the position of the matching points on the pneumatic tire and rim in order then to grip the pneumatic tire again and turn it into the matched position. This has the advantage that slippage of the pneumatic tire during mounting cannot impair precise matching.

As an alternative to the above-described arrangement of the camera on the gripper, the matching points of pneumatic tire and rim may also be detected as early as during delivery to the stations by cameras on the conveyor means. When the pneumatic tire is fetched from the conveyor means 4, the rotation angle position of the matching points on pneumatic tire and rim and the resultant difference in rotation angle are then already available as stored information. In this case, the pneumatic tire may be rotated into the calculated matched position by means of the actuator during transport into the mounting station, wherein any change in rotation angle arising through swiveling of the articulated arm of the manipulator likewise has of course to be taken into account.

What is claimed is:

1. A method for mounting a pneumatic tire on a well base rim of a motor vehicle wheel comprising the steps of:
   providing a robotic manipulator having an articulated arm movable in at least three spatial directions and a gripper mounted to the arm so as to be rotatable about at least two axes, the gripper comprising a support and a plurality of gripper fingers mounted on the support;
   controlling the movement of said gripper;
   providing a mounting station placed in the working range of said robotic manipulator;
   conveying a well base rim to said mounting station and fixing said rim in said mounting station by a clamping device;
   conveying a pneumatic tire associated with said rim into the working range of said robotic manipulator, the pneumatic tire having a first tire bead and a second tire bead;
   grasping said pneumatic tire at its outer tread using said gripper; and
   wherein the tire is held at the outer tread by said gripper accomplishing only by controlled movement of said gripper holding said pneumatic tire the steps of moving said gripper to said mounting station and swiveling said gripper relative to the articulated arm thereby moving said pneumatic tire into an oblique position inclined relative to said rim, advancing said gripper to said rim fixed in said mounting station, and lowering said pneumatic tire onto the rim so that one rim flange penetrates partly into an opening of at least the first tire bead facing said rim, swiveling said gripper so as to reduce the inclination of the tire relative to said rim and further advancing said gripper to said rim thereby slipping at least the first tire bead completely over the one rim flange; and
   mounting the second tire bead over the one rim flange.

2. The method according to claim 1, wherein the pneumatic tire is placed onto the rim by the manipulator in a position inclined relative to the rim, in which the axis of rotation of the pneumatic tire forms an angle with the axis of rotation of the rim, in such a way that a portion of the rim flange penetrates into the opening of the tire bead and the tire bead comes to rest against a point of the well base of the rim in the region of this portion of the rim flange and wherein the tire bead is then slipped over the rim flange by reducing the inclination of the pneumatic tire relative to the rim.

3. The method according to claim 2, wherein the pneumatic tire is turned, on reduction of its inclination relative to the rim, about the point of contact between the well base and the tire bead.

4. The method according to claim 1, wherein the pneumatic tire is held during mounting by the manipulator in such a way that the tire bead to be mounted adopts an oval shape.

5. The method according to claim 1, wherein the pneumatic tire delivered for mounting is grasped by the manipulator using the gripper in its delivery position and is held continuously by the gripper until mounting of at least one tire bead has been completed.

6. The method according to claim 5, wherein the pneumatic tire is transported using the manipulator to a soaping station and is moved along in the soaping station with the tire beads against a lubricant applicator.

7. The method according to claim 1, wherein matching of pneumatic tire and rim takes place during mounting.

8. The method according to claim 1, wherein the pneumatic tire is brought once again into an oblique position inclined relative to the rim by the manipulator after mounting of the first tire bead and moved in such a way relative to the rim that a portion of the rim flange penetrates into the opening of the second tire bead and the second tire bead comes into contact with the well base of the rim in the region of this portion of the rim flange, and wherein then the second tire bead is slipped over the rim flange by lowering the tire onto the rim and reducing the inclination of the tire relative to the rim.

9. The method according to claim 1, wherein mounting of the first tire bead is effected in a first mounting station using the manipulator and mounting of the second tire bead is effected in a second mounting station downstream of the first mounting station using mounting tools passed along the rim flange.

10. The method according to claim 1, comprising a further step of matching said pneumatic tire and said rim by rotating said gripper to align corresponding matching points on the tire and the rim.

* * * * *